(12) United States Patent
Sturges et al.

(10) Patent No.: US 10,931,815 B1
(45) Date of Patent: Feb. 23, 2021

(54) RESTRICTING VIDEO OR OTHER SERVICES FOR PERSONAL CONTROLLED-ENVIRONMENT FACILITY RESIDENT COMMUNICATION AND/OR DATA DEVICES TO SPECIFIC AREAS

(71) Applicant: Securus Technologies, Inc., Carrollton, TX (US)

(72) Inventors: James Sturges, Dallas, TX (US); Anthony Hershberger, McKinney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/169,152

(22) Filed: Oct. 24, 2018

(51) Int. Cl.
| | |
|---|---|
| *H04M 1/725* | (2006.01) |
| *H04M 3/38* | (2006.01) |
| *H04W 4/021* | (2018.01) |
| *H04W 4/80* | (2018.01) |
| *H04M 3/22* | (2006.01) |

(52) U.S. Cl.
CPC ..... *H04M 1/72572* (2013.01); *H04M 3/2281* (2013.01); *H04M 3/38* (2013.01); *H04W 4/021* (2013.01); *H04W 4/80* (2018.02)

(58) Field of Classification Search
CPC ......... H04W 4/02; H04W 4/021; H04W 4/50; H04W 4/80; H04W 4/025; H04W 64/00; H04W 4/00; H04W 48/02; H04W 48/04; H04W 48/12; H04W 48/16; H04W 4/022; H04W 48/08; H04W 48/18; H04W 4/029; H04W 4/30; H04M 1/72572; H04M 3/2281; H04M 3/38
See application file for complete search history.

(56) References Cited

U.S. PATENT DOCUMENTS

| | | | |
|---|---|---|---|
| 2007/0129012 A1* | 6/2007 | Snow ................ | H04M 1/72577 455/26.1 |
| 2008/0160984 A1* | 7/2008 | Benes ................. | H04M 1/7253 455/419 |
| 2012/0322370 A1* | 12/2012 | Lee ....................... | H04L 67/141 455/41.1 |

(Continued)

*Primary Examiner* — Daniel Lai
(74) *Attorney, Agent, or Firm* — Fogarty LLP (57) ABSTRACT

Personal controlled-environment facility resident communication and/or data devices deployed within a controlled-environment facility each have a device identification apparatus (e.g. RFID tag). Interrogators and/or readers disposed within zone(s) defined within the controlled-environment facility identify, recognize, or otherwise read the device identification apparatus(es). A controlled-environment facility management system and/or a controlled-environment facility communications processing system coupled to the interrogators and/or readers determine whether a particular personal device entering, attempting to operate in, leaving, or outside a particular zone is authorized to operate in that zone and/or is authorized to operate one or more particular apps in that zone, based upon the device identification apparatus identified, recognized, or otherwise read by the interrogator and/or reader within that zone. Commands are sent to an identified personal device and/or to an app operating on the device, based on whether the particular device and/or app is authorized to operate in or outside that zone.

21 Claims, 3 Drawing Sheets

(56) References Cited

U.S. PATENT DOCUMENTS

| | | | |
|---|---|---|---|
| 2014/0194084 A1* | 7/2014 | Noonan | H04B 17/318 455/404.1 |
| 2015/0050922 A1* | 2/2015 | Ramalingam | H04W 12/0027 455/418 |
| 2018/0176366 A1* | 6/2018 | Mukherjee | H04W 4/50 |

* cited by examiner

RESTRICTING VIDEO OR OTHER SERVICES FOR PERSONAL CONTROLLED-ENVIRONMENT FACILITY RESIDENT COMMUNICATION AND/OR DATA DEVICES TO SPECIFIC AREAS

TECHNICAL FIELD

This specification is related to communications by residents of controlled-environment facilities, specifically to safe and secure communications over personal controlled-environment facility resident communication and/or data devices, and particularly to restricting video or other services for residents via personal controlled-environment facility resident communication and/or data devices to specific monitored and controlled areas within the controlled-environment facility.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident. However, unrestricted access to wireless communication systems is not typically desirable for security or privacy reasons. For example, video communications pose particular issues due to privacy of other residents and may need to be restricted even more than other types of communication.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to sufficiently monitor communications of their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which restrict use of personal controlled-environment facility resident communication and/or data devices within a controlled-environment facility. Therein a device identification apparatus interrogator, reader and/or the like disposed within a zone defined within the controlled-environment facility may identify, recognize or otherwise read a device identification apparatus of each personal controlled-environment facility resident communication and/or data device entering or attempting to operate in that zone.

This device identification apparatus may be a Radio Frequency Identification (RFID) apparatus, which may be a passive RFID chip, or the like. In such cases, the device identification apparatus interrogators, readers, etc. may each be configured to send out an energetic radio signal within the particular zone the interrogator and/or reader is disposed. This illuminates RFID apparatuses of personal controlled-environment facility resident communication and/or data devices entering or attempting to operate in the particular zone. The device identification apparatus interrogators, readers, etc. then read the response(s) from any passive RFID apparatus(es) of personal device(s) entering or attempting to operate in the particular zone.

Alternatively, or additionally, the RFID apparatus may be an active RFID chip and the device identification apparatus interrogators, readers, etc. may each be configured to send out a radio signal within the particular zone the interrogator and/or reader is disposed to RFID apparatuses of personal controlled-environment facility resident communication and/or data devices entering or attempting to operate in the particular zone. Whereupon, a response from any active RFID apparatuses of personal devices entering or attempting to operate in the particular zone are read.

Alternatively, the device identification apparatus may be other RFID functionality, an Optical Identification (OID) mechanism, voice biometrics, fingerprint, iris, DNA, or the like, which may be integrated into, attached or otherwise associated with each personal device.

A controlled-environment facility management system, controlled-environment facility communications processing system, or the like may be coupled to the device identification apparatus interrogator, reader and/or the like. This controlled-environment facility management system, controlled-environment facility communications processing system, or the like may determine whether a personal controlled-environment facility resident communication and/or data device entering or attempting to operate in the zone, and/or whether one or more application programs (apps) operating on the personal device entering or attempting to operate in the zone, is authorized to operate in the zone. This determination may be based, at least in part, upon the device identification apparatus identified, recognized or otherwise read by the device identification apparatus interrogator, reader, etc.

The controlled-environment facility management system, controlled-environment facility communications processing system and/or the like may send first commands to the personal controlled-environment facility resident communication and/or data device entering or attempting to operate in the zone, and/or to the one or more apps operating on the personal device entering or attempting to operate in the zone. These first commands may be sent based on whether the personal device entering or attempting to operate in the zone, and/or the one or more apps operating on the personal device entering or attempting to operate in the zone, is authorized to operate in that zone.

The controlled-environment facility management system, controlled-environment facility communications processing system and/or the like may additionally, or alternatively, determine when a personal controlled-environment facility resident communication and/or data device is moving out of a zone, moves out of a zone, and/or has moved out of a zone.

Second commands may be sent, by the controlled-environment facility management system, controlled-environment facility communications processing system and/or the like, to the personal controlled-environment facility resident communication and/or data device moving and/or moved out of the zone, and/or to one or more apps operating on the personal device moving and/or moved out of the zone, based on the personal device moving or being moved out of the zone.

The commands sent to the particular personal controlled-environment facility resident communication and/or data device and/or to the one or more apps may include commands based on an extent and/or nature of operations the particular personal device and/or that the one or more apps operating on the personal device are authorized to carry-out in the particular zone. For example, the first commands sent may include commands activating or enabling one or more cameras of the personal device and/or activating or enabling use of one or more cameras of the personal device by the one or more apps. Alternatively, the first commands sent may include commands deactivating or disabling one or more functions of the personal device and/or the one or more apps, based on an extent and/or nature of operations the particular personal device and/or the one or more apps operating on the personal device are authorized to carry-out in the particular zone.

As another (alternative) example, the second commands sent to the particular personal controlled-environment facility resident communication and/or data device and/or to the one or more apps may include commands deactivating or disabling one or more cameras of the personal device and/or deactivating or disenabling use of one or more cameras of the personal device by the one or more apps. Alternatively, or additionally, the second commands sent to the particular personal device and/or to the one or more apps may include commands activating or enabling one or more functions of the particular personal device and/or activating or enabling use of one or more functions of the particular personal device by the one or more apps This Activation or enablement of one or more functions, may be based, at least in part, on an extent and/or nature of operations the particular personal device is authorized to carry-out other than in the particular zone and/or that the one or more apps are authorized to carry-out other than in the particular zone.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein.

In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Consistent with the forgoing desire to allow residents (e.g. prisoners) to have some contact with friends and family while confined to a controlled-environment facility (e.g. incarcerated), there is a desire for video communications via personal controlled-environment facility resident communication and/or data devices, such as inmate tablet computing devices adapted or otherwise approved for use in a particular correctional facility. However, there are grave risks involved to resident/inmate safety and security from allowing free-roaming of handheld cameras within a controlled-environment facility, such as a correctional institution. There is also a logistical challenge of monitoring potentially thousands of video or other communications sessions, simultaneously, for unauthorized content incoming to the facility from outside contacts. In accordance with embodiments of the present systems and methods, limiting video communications and the like to defined (monitored) zones within the controlled-environment facility prevent upload (or download) of unauthorized images from within the controlled-environment facility, and makes real-time monitoring of incoming images far more practical, for example, due to the present systems and methods limiting the number of video communications to only those taking part in the defined (monitored) zones. This has the advantage of allowing practical use of video communications over personal controlled-environment facility resident communication and/or data devices, which may facilitate replacement, or at least the necessary number, of expensive wall-mounted video visitation apparatuses in controlled-environment facilities and allow improved security and safety due to enhanced control mechanisms, in accordance with embodiments of the present systems and methods.

Hence, the present system and methods are related to communications by residents of controlled-environment facilities, specifically to safe and secure communications over personal controlled-environment facility resident communication and/or data devices, and particularly to restricting video or other services for residents via personal controlled-environment facility resident communication and/or data devices to specific monitored and controlled areas within the controlled-environment facility. These specific monitored and controlled areas are referred to herein as "zones" or "video zones." In accordance with embodiments of the present systems and methods, personal controlled-environment facility resident communication and/or data devices deployed within a controlled-environment facility each have a device identification apparatus (e.g. RFID tag). Interrogators and/or readers disposed within zone(s) defined within the controlled-environment facility identify, recognize, or otherwise read the device identification apparatus(es). A controlled-environment facility management system, controlled-environment facility communications processing system, or the like, coupled to the interrogators and/or readers, determine whether a particular personal device entering, attempting to operate in, leaving, or operating outside a particular zone is authorized to operate in that zone and/or is authorized to operate one or more particular apps in that zone, based upon the device identification apparatus identified, recognized, or otherwise read by the interrogator and/or reader within that zone. Commands are sent to an identified personal device and/or to an app operating on the device, based on whether the particular device and/or app is authorized to operate in or outside that zone.

Figure 1:
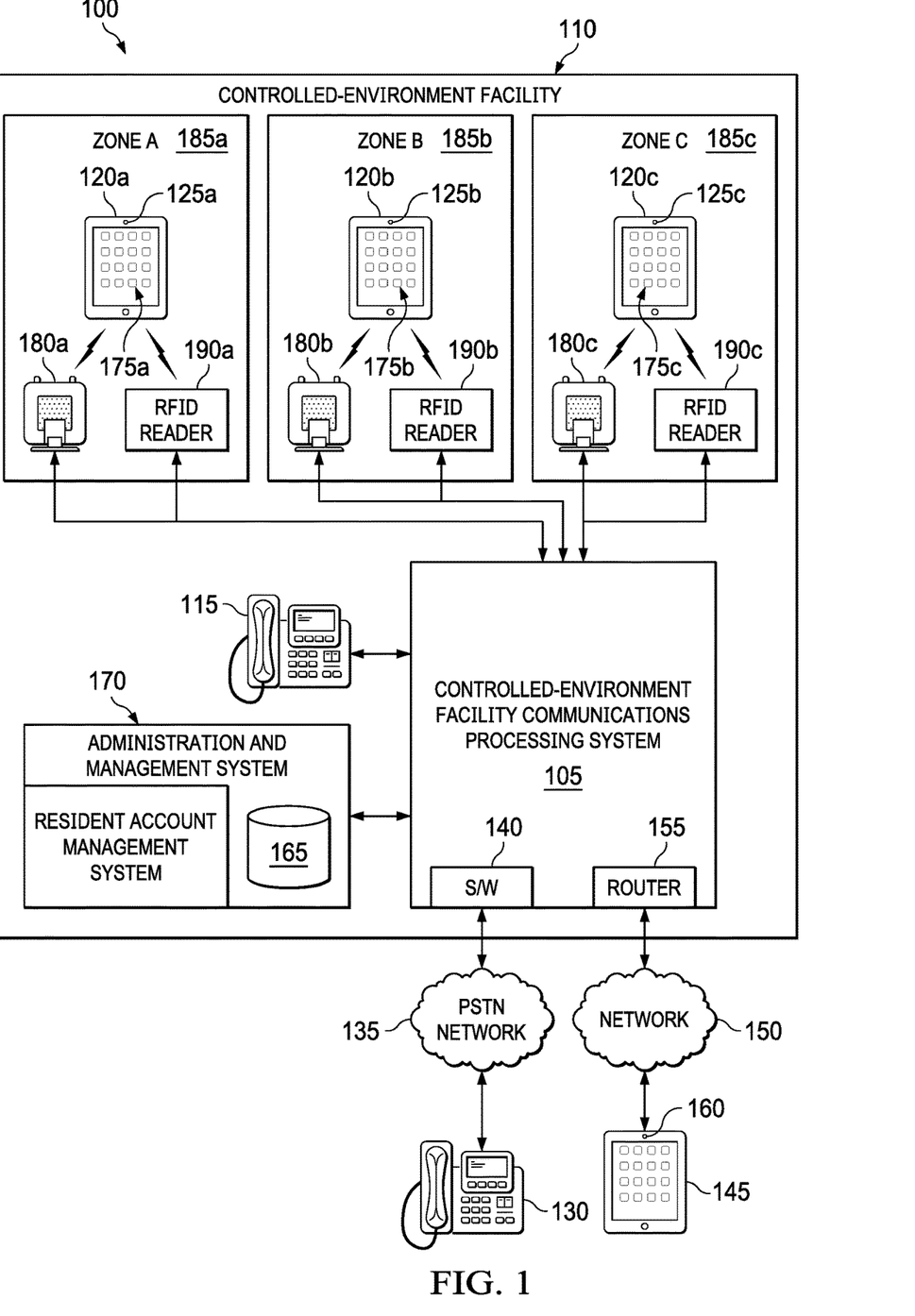
FIG. 1 is a diagrammatic illustration of an example communications environment, wherein an example embodiment of the present systems and methods for restricting video or other services for personal controlled-environment facility resident communication and/or data devices to specific areas within the controlled-environment facility may be deployed or otherwise employed, according to some embodiments.

FIG. 1 is a diagrammatic illustration of example communications environment 100, wherein an example embodiment of the present systems and methods for restricting video or other services for personal controlled-environment facility resident communication and/or data devices to specific areas within the controlled-environment facility may be deployed or otherwise employed, according to some embodiments. Communications processing system 105 may provide telephone services, videoconferencing, online chat, and other communication services to residents of controlled-environment facility 110. In some cases, such as illustrated, communications processing system 105 may be co-located with controlled-environment facility 110. Alternatively, communications processing system 105 may be centrally and/or remotely located with respect to one or more controlled-environment facilities and/or may provide communication services to multiple controlled-environment facilities. More generally, however, it should be noted that communications processing system 105 may assume a variety of forms and may be configured to serve a variety of facilities and/or users, whether within or outside of a controlled-environment facility.

Residents may use more-or-less conventional telephones 115 to access certain communication services. However, in accordance with embodiments of the present systems and methods, residents may also, or alternatively, use personal controlled-environment facility communication and/or media devices 120a through 120c, referred to herein collectively or individually as Intelligent Resident Device(s) (IRD(s)) 120, or the like. For example, a resident may use personal controlled-environment facility communication and/or media device 120, or the like, to place voice calls, as well as for video communication. Such a personal controlled-environment facility communication and/or media device 120 may be a personal computer wireless device, such as a tablet computing device or smartphone (120), which may have been adapted and/or approved for use in controlled-environment facility 110, may be used by controlled-environment facility residents for communication. Such a personal resident device may be referred to as the aforementioned Intelligent Resident Device (IRD), or the like, in controlled-environment facilities, in general and/or referred to as an Intelligent Inmate Device (IID) in a correctional institution environment.

As will be appreciated, IRD 120, or other similar devices may have video conferencing capabilities, or the like, such as front-facing camera 125 and a microphone, to enable a party to participate in video communication sessions with other call parties, such as non-residents of the controlled-environment facility, via video communication, secure online chat, etc. Controlled-environment facility personnel, such as correctional facility corrections officers, may, in the performance of their duties, employ personal wireless devices, such as tablet computing devices or smartphones. Regardless, such controlled-environment facility personnel devices, other controlled-environment facility personnel devices or terminals, IRDs, mss, etc. may be generally referred to herein as "personal controlled-environment facility communication and/or media devices," or the like.

As noted, IRDs 120 may be tablet computing devices, smartphones, media players, or the like adapted and/or approved for use by residents of the controlled-environment facility (within the controlled-environment facility). Each IRD 120 may be particularly adapted for use in a controlled-environment. For example, in a correctional institution, jail, or the like, such an IRD, or IID may have a specially adapted operating system and/or may be "stripped-down," particularly from the standpoint of what application programs (apps) and/or hardware are provided or allowed on IRD 120, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wireless Local Area Network (WLAN) access, or the like, only being available in certain areas. That is, for example, where streaming and/or downloading may be compartmentalized, leveraging the structure of the controlled-environment facility, for example, limiting the availability of a WLAN signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods video or other services for residents via IRDs 120 may be restricted to specific monitored and controlled areas within the controlled-environment facility referred to herein as "zones" or "video zones," as noted. Further, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society. Also, in certain embodiments, particularly in a correctional facility environment, a tablet computing device such as IRD 120 may be mounted on a wall, in a hardened case, as a community video communication device or Intelligent Facility Device (IFD).

Correctional facility corrections officers, or other controlled-environment facility personnel, may employ personal wireless devices, such as tablet computing devices or smartphones, in the performance of their duties. These controlled-environment facility personnel devices may be adapted in a manner similar to IRDs and/or IIDs 120, and/or otherwise approved, for use within the controlled-environment facility. However, such controlled-environment facility personnel devices may be adapted to prevent use by controlled-environment facility residents and/or to provide the controlled-environment facility personnel some degree of control over the IRDs, IIDs, or the like.

In accordance with embodiments of the present systems and methods, controlled-environment facility communications and/or media devices, 120, or the like, may present via a user interface, apps such as: a controlled-environment facility resident calling application, a video visitation application, a controlled-environment facility resident's manual, a controlled-environment facility resident form submittal program, a controlled-environment facility resident commissary ordering application, a music player, a video player, a web browser (which may be limited to only accessing secure websites and/or third party websites of approved vendors), a document reading program, an email application, a Prison Rape Elimination Act (PREA) information document, a PREA hotline, a legal research application, a job search application, a controlled-environment facility resident grievance submittal application, sick call app, education app, weather app, video mail, resident information app, games, a contacts functionality, and/or the like.

In various embodiments, to access communication services, a resident may initiate telephone services by lifting the receiver on telephone 115, and/or otherwise initiating a call, such as by launching a communications app on IRD 120. At which time, the resident may be prompted to provide a personal identification number (PIN), other identifying information or biometrics. An IVR unit (not shown, but which may be integrated into communication processing system 105) may generate and play a prompt, or other messages, to the resident on device 115, 120, or the like. Under the control of communication processing system 105, devices 115, 120, or the like may be capable of connecting to a non-resident's (i.e., a person not incarcerated or otherwise committed to a controlled-environment facility) telephone 130 across a Publicly Switched Telephone Network (PSTN) 135. For example, telephone 130 may be located at a non-resident's home or office, at a resident visitation center, etc. Switch 140, in communication processing system 105, may be used to connect calls across PSTN 135. Additionally, or alternatively, the non-resident may communicate using device 145, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 150. Router 155 of communication processing system 105 is used to route data packets associated with a call connection to device 145. For example, a non-resident party may have a device 145 with a built-in front-facing camera 160, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

In addition to providing certain visitation and communication operations, communication processing system 105 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in database 165 maintained by controlled-environment Administration and Management System (AMS) 170. In addition to PAC and/or PAN list(s), AMS 170 may also store Resident Profile Data (RPD), as well as communication and/or visitation rules applicable to each resident. As an example, in the context of a correctional facility, AMS 170 may be referred to as a Jail Management System (JMS). Within the AMS or JMS 170, database 165 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. A controlled-environment facility resident account management system, which may be a separate system, or may be a part or function of AMS 170, as illustrated in FIG. 1, may maintain resident accounts for the benefit of the respective resident, such as resident commissary accounts, resident communications accounts, which may be used to pay for communications, such as phone calls, video visitation, internet chats, emails, text messages, or the like, etc.

In some implementations, communication processing system 105 may be configured to perform communication monitoring operations, such being configured to monitor and or record communication sessions (e.g., as electronic video files). In scenarios where communication processing system 105 is located within the controlled-environment facility, it may have direct access to AMS or JMS 170. In other embodiments, however, communication processing system 105 may be located remotely with respect to the controlled-environment facility, and access to AMS or JMS 170 may be obtained via a computer network such as, for example, network 155.

Thus, in accordance with embodiments of the present systems and methods, a controlled-environment facility communications and/or media device 120, or the like, may include at least one processor and a memory coupled to the at least one processor, such as discussed in greater detail below, with reference to FIG. 3. This memory may be configured to store program instructions executable by the at least one processor. Such program instructions may include a controlled-environment facility communications and/or media device operating system, a controlled-environment facility user interface program, the aforementioned apps, etc. This interface program may include program instructions executable by the at least one processor to cause controlled-environment facility communications and/or media device 120, or the like to run the controlled-environment facility user interface on top of, or as part of, the operating system and present apps available for use by a controlled-environment facility user on the controlled-environment facility communications and/or media device. The interface may act as a controlled-environment facility user communications platform, and also or alternatively, provide automated login for interface applications, provide a(n) (interactive) controlled-environment facility bulletin board, etc. The interface may request and accept identification information from the controlled-environment facility user, such as information that may confirm the identity of the user. This identification may be verified, such as through the interface, by controlled-environment facility communications processing system 105, AMS 170, and/or the like, to complete such a login. In accordance with embodiments of the present systems and methods, the interface program instructions may also permit and/or facilitate execution of the apps, such as when one of these apps is selected by the resident, via the displayed interface (175). Further, in accordance with embodiments of the present systems and methods one such app may be a video communications application, such as may facilitate video conferencing or video visitation between a resident and one or more non-residents (or other residents of the same or another controlled-environment facility). As noted, IRD 120, or other similar devices may have video conferencing capabilities, or the like, such as front-facing camera 125 and a microphone, to enable a party to participate in video communication sessions with other call parties. The interface may also countdown a predetermined amount of time the selected app remains active, a predetermined number of times that an app can be opened, a predetermined number of times that a form can be submitted, a predetermined time an app remains open and/or is executed, multitasking functionality between open apps, etc.

In accordance with embodiments of the present systems and methods a controlled-environment facility communications system may include controlled-environment facility communications and/or media device(s) (120, or the like), controlled-environment facility communications processing system 105, controlled-environment facility administration and management system 170, and/or the like. Therein, inward facing connectivity from and to controlled-environment facility communications processing system 105 extends from and to controlled-environment facility resident media devices 120a-120c, such as via wireless access points 180a-180c (referred to herein individually or collectively as 180), Ethernet connectivity and/or the like. These access points may be dedicated wired or wireless access points, such as a WLAN router or the like. Hence, the internal controlled-environment facility connectivity may include WLAN connectivity, and in such embodiments a local area network employing the WLAN connectivity includes wireless access points 180a-180c, each disposed in corresponding portion 185a-185c (referred to herein individually or collectively as 185) of the controlled-environment facility to provide access by controlled-environment facility resident media devices disposed in that portion of the controlled-environment facility. These specific areas may be monitored and/or controlled in accordance with embodiments of the present systems and methods. As noted, these specific monitored and controlled areas are referred to herein as "zones" or "video zones." However, such a zone could be any zone within the facility that is defined to a location. For example, the zones discussed herein may include a law library zone, gaming zones, phone call zones, commissary/ordering zones, training/education zones, homework zones, religious zones, etc.

Consentient with the foregoing, where the controlled-environment facility is a correctional facility, a video zone, or the like, for example, may be established in a portion of the correctional facility, such as a cellblock, a pod, one or more common areas, a laundry room, the yard (outside), one or more dayrooms, the cafeteria, exercise facilities or the like. So, in a correctional facility embodiment, a WLAN may employ wireless access point 180*a* disposed in zone 185*a* of correctional facility 110 to provide access by inmate media device 120*a*, also disposed in zone 185*a*.

In some embodiments, due to the nature of the construction (e.g., steel, steel-reinforced concrete, or the like) and/or layout (e.g. radiating pod structure, or the like) of a correctional facility, coverage from a particular wireless access point (180*a*), should be contained to the zone (185*a*) in which it is installed, and hence only reach resident devices (120*a*) located in that zone (185*a*), and be more-or-less isolated from devices (120*b* and 120*c*) in other zones (185*b* and 185*c*), or outside of video zones. Zones may be further compartmentalized by taking advantage of, or employing, antenna directionality of wireless access points 180*a*-180*c*, signal strength, and/or the like. For example, an authorized transceiver power level may be determined for communicating with the user interface device in response to a request. Additionally, such a system or method may dynamically set a transceiver power in response to the determination. As a further example, a secure network access point may include one or more antennas used for wirelessly communicating with a user interface device, such as the aforementioned resident tablets. The one or more antennas may be configured to communicate using a dynamically settable power level. For example, the antenna may be configured to communicate within a first range at a first power level, within a second range at a second power level, and at a third range at a third power level. In addition, the antenna and/or associated RF equipment may be shut off or filtered to terminate communications between the secure network access point and the user interface device. The antenna may be an omnidirectional antenna, a directional antenna, a beam-forming antenna, etc. In some embodiments, the first communication range may be within a few feet of a secure network access point, or even a few inches, requiring the resident to go to a more-or-less or very specific location, such as a communications kiosk, resident phone, classroom, etc. to download and/or stream content. Further security measures may call for determining an authorized duration of network access for the user interface device. Additionally, the method may include establishing a temporary network access session between the user interface device and the network for the authorized duration of network access, and/or temporary access key for network access.

However, embodiments of the present systems and methods for restricting video or other services for controlled-environment facility residents via personal controlled-environment facility resident communication and/or data devices to the specific monitored and controlled zones within the controlled-environment facility may make use of a device identification apparatus, such as an RFID tag or chip, other RFID functionality, an Optical Identification (OID) mechanism, voice biometrics, fingerprint, iris, DNA, or the like, which may be integrated into, attached or otherwise associated with each IRD 120.

Figure 2:
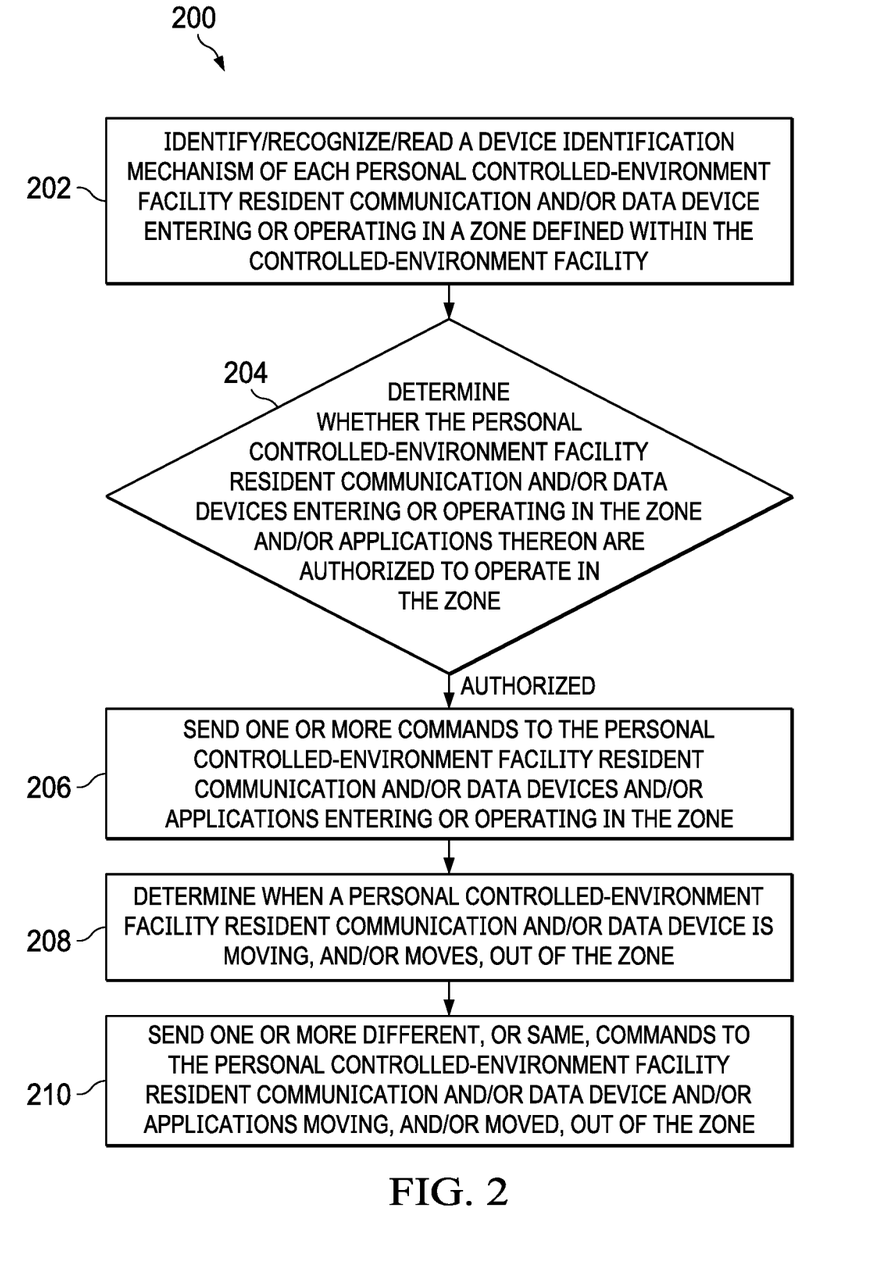
FIG. 2 is a flowchart of an example process for restricting video or other services for personal controlled-environment facility resident communication and/or data devices to specific areas within a controlled-environment facility, in accordance with some embodiments.

A resulting system restricting use of personal controlled-environment facility resident communication and/or data devices (IRDs 120) within the controlled-environment facility 110, for example implementing the process of FIG. 2, include the IRDs 120 deployed within the controlled-environment facility having such a device identification apparatus (i.e. an RFID tag, other RFID functionality, an OID mechanism, voice biometrics, fingerprint, iris, DNA, or the like). As one of skill in the art will recognize radio-frequency identification (RFID) uses tags, labels, or other apparatus attached to, or otherwise associated with or incorporated into an object to be identified (referred to generally herein as "RFID tags"). Two-way radio transmitter-receivers called interrogators or readers send a signal to the RFID tag and read its response. RFID tags can be either passive, active or battery-assisted passive. An active RFID tag has an on-board battery and periodically transmits its ID signal. A battery-assisted passive (BAP) RFID tag has a small battery on board and is activated when in the presence of an RFID reader. A passive tag is cheaper and smaller because it has no battery; instead, the tag uses the radio energy transmitted by the reader. Embodiments of the present systems and methods may generally employ passive RFID but may use active and/or BAP RFID. In accordance with embodiments of the present systems and methods active and/or BAP RFID may make use of the power supply (e.g. the battery) of the tagged IRD to power the RFID tag. However, operation of passive RFID may be particularly well suited for use in a controlled-environment facility, such as a correctional facility. That is, the structure of the facility, power and/or directionality of RFID readers/interrogators, and/or the like, may be leveraged, similarly as described above with respect to WLANS, to provide and shape (RFID) zones 185*a*-*c*.

Hence, device identification apparatus interrogators and/or readers 190*a*-*c* (referred to herein individually or collectively as 190), such as RFID interrogators and/or readers, optical bar code readers, or the like are disposed within each defined video zones 185*a*-*c* within controlled-environment facility 110. Each of device identification apparatus interrogators and/or readers 190 identify, recognize, or otherwise read, the device identification apparatus of IRDs 120 entering or operating in a particular zone in which it is disposed. For example, the RFID apparatus may be a passive RFID chip, or the like, disposed in, attached to, or otherwise associated with an IRD. In such case, the device identification apparatus interrogators and/or readers may be active RFID interrogators, which are each configured to send out an energetic radio signal within (and confined to) the particular zone in which the particular RFID interrogator is disposed, thereby "illuminating" RFID tags, or the like, of IRDs entering or operating in that particular zone. The RFID interrogator should then be able to read a response from any RFID apparatuses of IRDs entering or operating in the particular zone. Alternatively, or additionally, in systems where the RFID apparatus is an active RFID chip, the device identification apparatuses may be RFID readers, which are each configured to send out a radio signal, within (and confined to) the particular zone in which the particular RFID reader is disposed, to RFID apparatuses of IRDs entering or operating in that particular zone. The RFID reader then reads responses from any RFID apparatuses of IRDs entering or operating in that particular zone. These device identification apparatus interrogators and/or readers are also coupled to controlled-environment facility communications processing system 105, AMS 170, and/or the like, such as via Ethernet connectivity, WLAN connectivity, or the like.

In accordance with embodiments of the present systems and methods, controlled-environment facility communications processing system 105, AMS 170, and/or the like, determines whether a particular IRD entering, or operating in, a particular zone is authorized to operate in that particular zone, based upon the device identification apparatus identified, recognized, or otherwise read by a device identification apparatus interrogator and/or reader disposed within that particular zone. Additionally, or alternatively, controlled-environment facility communications processing system 105, AMS 170, and/or the like, may determine whether the particular IRD entering, or operating in, the particular zone is authorized to operate one or more particular apps in that particular zone, such as an app running on the device. Again, such a determination may be made based upon the device identification apparatus identified, recognized, or otherwise read by a device identification apparatus interrogator and/or reader disposed within that particular zone.

Controlled-environment facility communications processing system 105, AMS 170, and/or the like, then sends one set of commands to the particular IRD, and/or an app operating thereon, based on whether the particular IRD entering or operating in the particular zone is authorized to operate the articular app, or operate at all, in that particular zone. The commands sent to the particular IRD, and/or app operating thereon, may include commands based on an extent and/or nature of operations the particular IRD and/or app is authorized to carry-out in the particular zone. For example, the commands sent to the particular IRD entering, or operating in, the particular zone may include commands such as commands activating or enabling one or more cameras of the particular IRD entering or operating in a/the particular zone, or an app's use of the camera(s).

Additionally, controlled-environment facility communications processing system 105, AMS 170, and/or the like, determines when a particular IRD moves out of a particular zone and sends another set of commands to that particular IRD, and/or apps operating thereon, based on the particular IRD moving out of the particular zone. These commands may also include commands based on an extent and/or nature of operations the particular IRD, and/or apps operating thereon, are authorized to carry-out in the particular zone. For example, the commands sent to the particular IRD moving or moved out of the particular zone may include commands deactivating or disabling one or more cameras of the particular IRD moving, or moved, out of the particular zone, or at least use of the cameras by an app operating on the IRD.

In accordance with embodiments of the present systems and methods, the zones, rather than being video zones or the like, may be video exclusion zones or the like. For example, a restroom or shower area in a controlled-environment facility may be established as such an exclusion zone. Therein, the commands sent to the particular IRD entering, or (attempting to) operat(e)(ing) in, a particular exclusion zone, and/or sent to app(s) operating on this IRD, may include commands deactivating or disabling one or more functions of the particular IRD entering, or (attempting to) operat(e)(ing) in, the particular exclusion zone, or use thereof. This deactivation or disablement may be based on an extent and/or nature of operations the particular IRD entering or operating in a/the particular zone, and/or app operating thereon, are authorized to carry-out in the particular zone.

Likewise, in operation of such exclusion zones, controlled-environment facility communications processing system 105, AMS 170, and/or the like, may send commands to the particular IRD moving, or moved, out of the particular exclusion zone that activate or enable one or more functions of the particular IRD moving or moved out of the particular zone, based on an extent and/or nature of operations the particular IRD moving, or moved, out of the particular exclusion zone, and/or app operating thereon, are authorized to carry-out other than in the particular exclusion zone.

FIG. 2 is a flowchart of example process 200 for restricting video or other services for personal controlled-environment facility resident communication and/or data devices to specific areas within a controlled-environment facility, in accordance with some embodiments. As noted, these specific monitored and controlled areas are referred to herein as "zones" or "video zones." Process 200 may call for a device identification apparatus interrogator and/or reader (190 *a, b* or *c*) disposed within a zone (185*a, b* or *c*) defined within the controlled-environment facility (110), identifying, recognizing, or otherwise reading, a device identification apparatus of each personal controlled-environment facility resident communication and/or data device (IRD 120 *a, b* or *c*) entering or otherwise operating in its zone, at 202. As noted above, the device identification apparatus identified, recognized, or otherwise read at 202 may be an RFID tag, chip, or the like, an OID bar code, voice biometrics, fingerprint, iris, DNA, or the like, etc. With respect to passive RFID chips, tags or the like, an RFID interrogator/reader may send out an energetic radio signal within (and confined to) the interrogator/reader's zone, to illuminate any RFID tag or chip of any IRDs currently in that zone, for reading at 202, by the interrogator/reader, while the IRD is in that zone. For active RFID chips or tags, the interrogator/reader may send out a radio signal within (and confined to) the interrogator/reader's zone to the RFID apparatuses of the IRDs in the zone, as part of the identifying/recognizing/reading of the RFID apparatus at 202, such as from a response provided by the active RFID apparatuses of IRDs while they are in that zone.

At 204, a controlled-environment facility AMS (170), controlled-environment facility communications processing system (105), or the like, coupled to the device identification apparatus interrogator and/or reader, determines whether a IRD (120 *a, b* or *c*) entering or operating in the zone is authorized to operate in the zone (185 *a, b* or *c* (respectively)), in general and/or authorized to operate one or more particular apps in the zone. This determination may be based, at least in part, upon the device identification apparatus identified, recognized, or otherwise/read by the device identification apparatus interrogator and/or reader at 202.

The AMS, controlled-environment facility communications processing system, or the like, may send one or more commands to the IRD operating in the zone, and/or to one or more apps operating on the IRD entering or operating in the zone, at 206. The commands issued at 206 may be selected based, at least in part, on whether the IRD entering or operating in the zone, and/or app(s) operating on the IRD, is (are) authorized to operate in the zone. That is, the commands sent to the IRD and/or app(s) may include commands that are selected based on an extent and/or nature of operations the IRD and/or app(s) is (are) authorized to carry-out in the zone. For example, these (first) commands sent to the IRD and/or app(s) at 206 may include commands activating or enabling one or more cameras of the IRD if the IRD and/or app(s) is (are) authorized for video communication in that zone. Alternatively, in embodiments where the zones act as exclusion zones, or in a case where the IRD identified at 202 is determined at 204 to not be authorized to operate in the particular zone, in general, or not authorized to operate one or more particular apps, these (first) commands sent to the IRD and/or app(s) at 206 may, conversely, include commands deactivating or disabling one or more functions of the IRD and/or app(s), based on an extent and/or nature of operations the IRD and/or app(s) is (are) authorized to operate in the (exclusion) zone.

At 208, a determination may be made, such as by the AMS, controlled-environment facility communications processing system, and/or the like, as to when the IRD is moving, and/or has moved, out of the zone. Whereupon, another (second) set of commands are sent, at 210, by the AMS, controlled-environment facility communications processing system, and/or the like to the IRD and/or one or more app(s) operating on the device moving, and/or moved, out of the zone. The commands making up this (second) set of commands may be based on the fact the IRD is moving, or has moved, out of the zone. These (second) commands sent to the IRD and/or app(s) at 210 may include commands selected based on an extent and/or nature of operations the IRD and/or app(s) were authorized to carry-out in the zone. For example, the commands in this (second) set of commands sent to the IRD and/or app(s) at 210, may include commands deactivating or disabling one or more cameras of the IRD when the IRD moves out of a video zone. Conversely, in embodiments where the zones act as exclusion zones, these (second) commands sent to the IRD and/or app(s) at 210, may include commands activating or enabling one or more functions of the IRD and/or app(s). Selection of these (second) commands sent out at 210 in such alternative embodiments may be based on an extent and/or nature of operations the IRD and/or app(s) is (are) authorized to carry-out other than in the zone.

Embodiments of the present systems and methods for restricting video or other services for personal controlled-environment facility resident communication and/or data devices to specific areas within the controlled-environment facility, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of, controlled-environment facility communications processing system 105, IRD 120, controlled environment facility management system 170, and/or the like. In various embodiments two or more of these computer systems may be configured to communicate with each other in any suitable way, such as, for example, via a network (e.g., in FIG. 1, device 120 is illustrated as wirelessly communicating using wireless functionality).

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Figure 3:
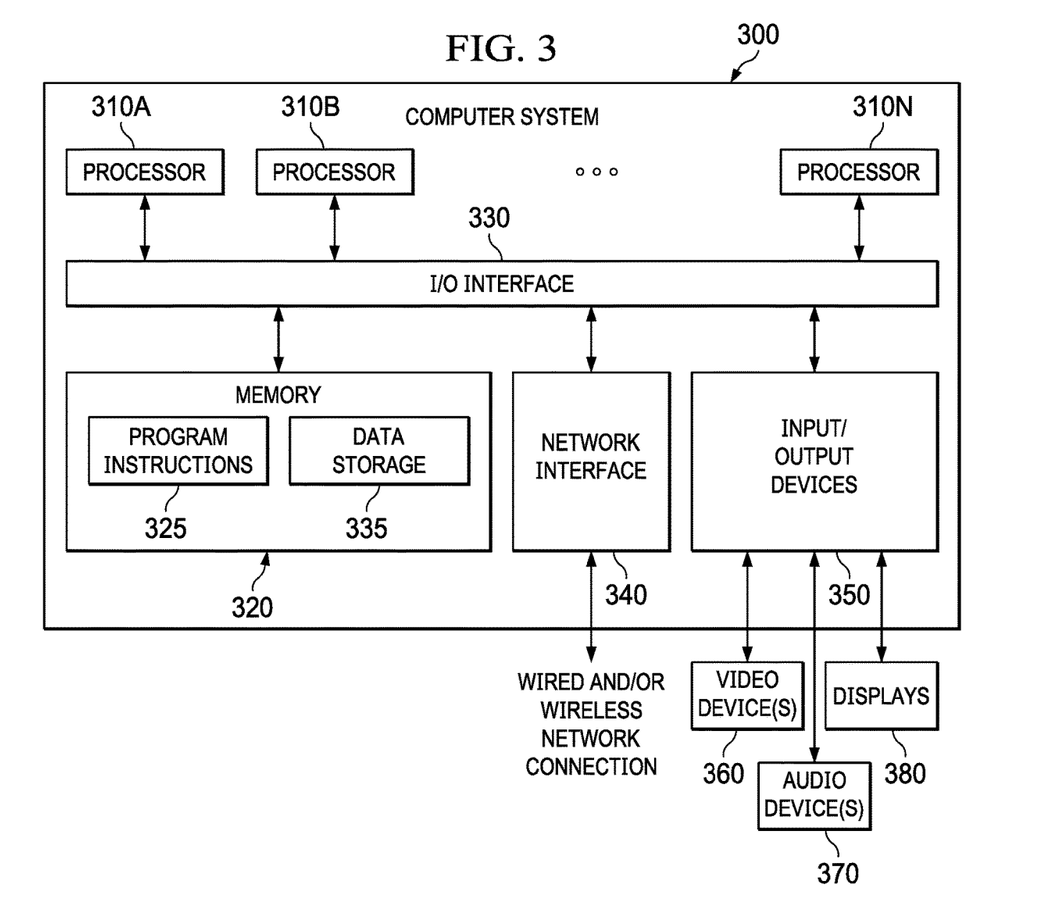
FIG. 3 is a block diagram of a computer system, device, station, or terminal configured to implement various techniques disclosed herein, according to some embodiments.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system restricting use of personal controlled-environment facility resident communication and/or data devices within a controlled-environment facility, the system comprising:

one or more personal controlled-environment facility resident communication and/or data devices deployed within a controlled-environment facility, each personal controlled-environment facility resident communication and/or data device comprising a device identification apparatus, and each personal controlled-environment facility resident communication and/or data device adapted for use in the controlled-environment facility to an extent and/or nature of operations the personal controlled-environment facility resident communication and/or data device is authorized to carry-out within the controlled-environment facility other than in one or more zones defined within the controlled-environment facility;

device identification apparatus interrogators and/or readers, each disposed within a zone defined within the controlled-environment facility and configured to identify, recognize, or otherwise read the device identification apparatus; and a controlled-environment facility management system and/or controlled-environment facility communications processing system coupled to the device identification apparatus interrogators and/or readers and configured to:

determine whether a particular personal controlled-environment facility resident communication and/or data device entering or attempting to operate in a particular zone is authorized to operate in the particular zone and/or authorized to operate one or more particular application programs in the particular zone, based upon the device identification apparatus identified, recognized, or otherwise read by a device identification apparatus interrogator and/or reader disposed within the particular zone;

send first commands to the particular personal controlled-environment facility resident communication and/or data device and/or to one or more application programs operating on the particular personal controlled-environment facility resident communication and/or data device, based on whether the particular personal controlled-environment facility resident communication and/or data device is authorized to operate in the particular zone and/or the one or more application programs is authorized to operate in the particular zone on the particular personal controlled-environment facility resident communication and/or data device;

determine when the particular personal controlled-environment facility resident communication and/or data devices moves out of the particular zone; and send second commands to the particular personal controlled-environment facility resident communication and/or data device and/or to the one or more application programs, based on the particular personal controlled-environment facility resident communication and/or data device moving out of the particular zone and based on the extent and/or nature of operations the particular personal controlled-environment facility resident communication and/or data device is authorized to carry-out within the controlled-environment facility other than in that particular zone and/or the one or more application programs are authorized to carry-out within the controlled-environment facility other than in that particular zone.

2. The system of claim 1, wherein at least one of the commands sent to the particular personal controlled-environment facility resident communication and/or data device and/or to one or more application programs include commands based on an extent and/or nature of operations the particular personal controlled-environment facility resident communication and/or data device is authorized to carry-out in the particular zone and/or the one or more application programs are authorized to carry-out in the particular zone.

3. The system of claim 1, wherein at least one of the first commands sent to the particular personal controlled-environment facility resident communication and/or data device and/or to one or more application programs includes commands activating or enabling one or more cameras of the particular personal controlled-environment facility resident communication and/or data device and/or activating or enabling use of one or more cameras of the particular personal controlled-environment facility resident communication and/or data device by the one or more application programs.

4. The system of claim 1, wherein at least one of the first commands sent to the particular personal controlled-environment facility resident communication and/or data device and/or to the one or more application programs includes commands deactivating or disabling one or more functions of the particular personal controlled-environment facility resident communication and/or data device and/or the one or more application programs, based on an extent and/or nature of operations the particular personal controlled-environment facility resident communication and/or data device is authorized to carry-out in the particular zone and/or the one or more application programs are authorized to carry-out in the particular zone.

5. The system of claim 1, wherein at least one of the second commands sent to the particular personal controlled-environment facility resident communication and/or data device and/or to the one or more application programs includes commands deactivating or disabling one or more cameras of the particular personal controlled-environment facility resident communication and/or data device and/or deactivating or disenabling use of one or more cameras of the particular personal controlled-environment facility resident communication and/or data device by the one or more application programs.

6. The system of claim 1, wherein at least one of the second commands sent to the particular personal controlled-environment facility resident communication and/or data device and/or to the one or more application programs includes commands activating or enabling one or more functions of the particular personal controlled-environment facility resident communication and/or data device and/or activating or enabling use of one or more functions of the particular personal controlled-environment facility resident communication and/or data device by the one or more application programs, based on an extent and/or nature of operations the particular personal controlled-environment facility resident communication and/or data device is authorized to carry-out within the controlled-environment facility other than in the particular zone and/or the one or more application programs are authorized to carry-out other than in the particular zone.

7. The system of claim 1, wherein the device identification apparatus is a radio frequency identification apparatus.

8. The system of claim 7, wherein the radio frequency identification apparatus is a passive radio frequency identification chip and the device identification apparatus interrogators and/or readers are each configured to:
send out an energetic radio signal within the particular zone the interrogator and/or reader is disposed, illuminating radio frequency identification apparatuses of personal controlled-environment facility resident communication and/or data devices entering or attempting to operate in the particular zone; and
read a response from any passive radio frequency identification apparatuses of personal controlled-environment facility resident communication and/or data devices entering or attempting to operate in the particular zone.

9. The system of claim 7, wherein the radio frequency identification apparatus is an active radio frequency identification chip and the device identification apparatus interrogators and/or readers are each configured to:
send out a radio signal within the particular zone the interrogator and/or reader is disposed to radio frequency identification apparatuses of personal controlled-environment facility resident communication and/or data devices entering or attempting to operate in the particular zone; and
read a response from any active radio frequency identification apparatuses of personal controlled-environment facility resident communication and/or data devices entering or attempting to operate in the particular zone.

10. The system of claim 1, wherein the device identification apparatus is an optical identification apparatus.

11. A method for restricting use of personal controlled-environment facility resident communication and/or data devices within a controlled-environment facility, the method comprising:
adapting personal controlled-environment facility resident communication and/or data devices for use within the controlled-environment facility to an extent and/or nature of operations the personal controlled-environment facility resident communication and/or data device is authorized to carry-out within the controlled-environment facility other than in one or more zones defined within the controlled-environment facility;
identifying, recognizing or otherwise reading, by a device identification apparatus interrogator and/or reader disposed within a zone defined within the controlled-environment facility, a device identification apparatus of each personal controlled-environment facility resident communication and/or data device entering or attempting to operate in the zone;
determining, by a controlled-environment facility management system and/or controlled-environment facility communications processing system coupled to the device identification apparatus interrogator and/or reader, whether a personal controlled-environment facility resident communication and/or data device entering or attempting to operate in the zone, and/or one or more application programs operating on the personal controlled-environment facility resident communication and/or data device entering or attempting to operate in the zone, is authorized to operate in the zone, based upon the device identification apparatus identified, recognized or otherwise read by the device identification apparatus interrogator and/or reader;
sending first commands, by the controlled-environment facility management system and/or controlled-environment facility communications processing system, to the personal controlled-environment facility resident communication and/or data device entering or attempting to operate in the zone, and/or to the one or more application programs operating on the personal controlled-environment facility resident communication and/or data device entering or attempting to operate in the zone, based on whether the personal controlled-environment facility resident communication and/or data device entering or attempting to operate in the zone, and/or the one or more application programs operating on the personal controlled-environment facility resident communication and/or data device entering or attempting to operate in the zone, is authorized to operate in the zone;

determining, by the controlled-environment facility management system and/or controlled-environment facility communications processing system, when a personal controlled-environment facility resident communication and/or data device is moving and/or moves out of the zone; and sending second commands, by the controlled-environment facility management system and/or controlled-environment facility communications processing system, to the personal controlled-environment facility resident communication and/or data device moving and/or moved out of the zone, and/or the one or more application programs operating on the personal controlled-environment facility resident communication and/or data device moving and/or moved out of the zone, based on the personal controlled-environment facility resident communication and/or data device moving out of the zone and based on the extent and/or nature of operations the personal controlled-environment facility resident communication and/or data device moving out of or moved out of the zone, and/or the one or more application programs operating on the personal controlled-environment facility resident communication and/or data device moving out of or moved out of the zone, are authorized to carry-out within the controlled-environment facility other than in that zone.

12. The method of claim 11, wherein at least one of the commands sent to personal controlled-environment facility resident communication and/or data devices, and/or to one or more application programs, include commands based on an extent and/or nature of operations the personal controlled-environment facility resident communication and/or data device, and/or to one or more application programs, are authorized to carry-out in the zone.

13. The method of claim 11, wherein at least one of the first commands sent to the personal controlled-environment facility resident communication and/or data device entering or attempting to operate in the zone, and/or to one or more application programs operating on the personal controlled-environment facility resident communication and/or data device entering or attempting to operate in the zone, include commands activating or enabling one or more cameras of the personal controlled-environment facility resident communication and/or data device, and/or activating or enabling use of one or more cameras of the personal controlled-environment facility resident communication and/or data device entering or attempting to operate in the zone for use by the one or more application programs operating on the personal controlled-environment facility resident communication and/or data device entering or attempting to operate in the zone.

14. The method of claim 11, wherein at least one of the first commands sent to the personal controlled-environment facility resident communication and/or data device entering or attempting to operate in the zone, and/or to one or more application programs operating on the personal controlled-environment facility resident communication and/or data device entering or attempting to operate in the zone, include commands deactivating or disabling one or more functions of the personal controlled-environment facility resident communication and/or data device entering or attempting to operate in the zone, and/or deactivating or disabling one or more functions of the one or more application programs operating on the personal controlled-environment facility resident communication and/or data device entering or attempting to operate in the zone, based on an extent and/or nature of operations the personal controlled-environment facility resident communication and/or data device entering or attempting to operate in the zone, and/or the one or more application programs operating on the personal controlled-environment facility resident communication and/or data device entering or attempting to operate in the zone, are authorized to carry-out in the zone.

15. The method of claim 11, wherein at least one of the second commands sent to the personal controlled-environment facility resident communication and/or data device entering or attempting to operate in the zone, and/or to the one or more application programs operating on the personal controlled-environment facility resident communication and/or data device entering or attempting to operate in the zone, include commands deactivating or disabling one or more cameras of the personal controlled-environment facility resident communication and/or data device, and/or deactivating or disenabling use of one or more cameras of the personal controlled-environment facility resident communication and/or data device entering or attempting to operate in the zone, by the one or more application programs.

16. The method of claim 11, wherein at least one of the second commands sent to the personal controlled-environment facility resident communication and/or data device moving out of or moved out of the zone, and/or to one or more application programs operating on the personal controlled-environment facility resident communication and/or data device moving out of or moved out of the zone, include commands activating or enabling one or more functions of the personal controlled-environment facility resident communication and/or data device moving out of or moved out of the zone, and/or activating or enabling use of one or more functions of the personal controlled-environment facility resident communication and/or data device moving out of or moved out of the zone by the one or more application programs, based on an extent and/or nature of operations the personal controlled-environment facility resident communication and/or data device moving out of or moved out of the zone, and/or the one or more application programs operating on the personal controlled-environment facility resident communication and/or data device moving out of or moved out of the zone, are authorized to carry-out within the controlled-environment facility other than in the zone.

17. The method of claim 11, wherein the device identification apparatus is a radio frequency identification apparatus.

18. The method of claim 17, wherein the radio frequency identification apparatus is a passive radio frequency identification chip and the method further comprises:

sending out, by the device identification apparatus interrogator and/or reader, an energetic radio signal within the zone, illuminating a radio frequency identification apparatus of the personal controlled-environment facility resident communication and/or data device, while in the zone; and reading, by the device identification apparatus interrogator and/or reader, a response from the passive radio frequency identification apparatus of the personal controlled-environment facility resident communication and/or data device, while in the zone.

19. The method of claim 17, wherein the radio frequency identification apparatus is an active radio frequency identification chip and the method further comprises:
sending out, by the device identification apparatus interrogator and/or reader, a radio signal within the zone to the radio frequency identification apparatus of the personal controlled-environment facility resident communication and/or data device, while in the zone; and
reading, by the device identification apparatus interrogator and/or reader, a response from the active radio frequency identification apparatuses of personal controlled-environment facility resident communication and/or data device, while in the zone.

20. The method of claim 11, wherein the device identification apparatus is an optical identification apparatus.

21. A computer readable non-transitory medium having program instructions stored thereon that upon execution by a controlled-environment facility management system and/or controlled-environment facility communications processing system, cause the a controlled-environment facility management system and/or controlled-environment facility communications processing system to:
approve use, within the controlled-environment facility, of personal controlled-environment facility resident communication and/or data devices each adapted to an extent and/or nature of operations the personal controlled-environment facility resident communication and/or data device is authorized to carry-out within the controlled-environment facility other than in one or more zones defined within the controlled-environment facility;
receive identification of a device identification apparatus of each personal controlled-environment facility resident communication and/or data device entering or attempting to operate in a zone defined within the controlled-environment facility from a device identification apparatus interrogator and/or reader disposed within the zone and coupled to the controlled-environment facility management system and/or controlled-environment facility communications processing system;
determine whether the personal controlled-environment facility resident communication and/or data device entering or attempting to operate in the zone, and/or one or more application programs operating on the personal controlled-environment facility resident communication and/or data device entering or attempting to operate in the zone, are authorized to operate in the zone, based upon the device identification apparatus identified by the device identification apparatus interrogator and/or reader disposed within the zone;
send one or more commands to the personal controlled-environment facility resident communication and/or data device entering or attempting to operate in the zone, and/or one or more application programs operating on the personal controlled-environment facility resident communication and/or data device entering or attempting to operate in the zone, based on whether the personal controlled-environment facility resident communication and/or data device entering or attempting to operate in the zone, and/or one or more application programs operating on the personal controlled-environment facility resident communication and/or data device entering or attempting to operate in the zone, are authorized to operate in the zone;
determine when a personal controlled-environment facility resident communication and/or data device is moving and/or moves out of the zone; and
send one or more different or same commands to the personal controlled-environment facility resident communication and/or data device moving and/or moved out of the zone, and/or one or more application programs operating on the personal controlled-environment facility resident communication and/or data device moving and/or moved out of the zone, based on the personal controlled-environment facility resident communication and/or data device moving or having moved out of the zone and based on the extent and/or nature of operations the personal controlled-environment facility resident communication and/or data device is authorized to carry-out within the controlled-environment facility other than in that zone and/or the one or more application programs are authorized to carry-out within the controlled-environment facility other than in that zone.

* * * * *